United States Patent
Ajila et al.

(10) Patent No.: US 10,061,570 B2
(45) Date of Patent: *Aug. 28, 2018

(54) PER TENANT INITIALIZATION CHECK REMOVAL

(71) Applicant: International Business Machines Corporation, Armonk, NY (US)

(72) Inventors: Oluwatobi A. Ajila, Ottawa (CA); Graham A. Chapman, Nepean (CA); Michael H. Dawson, Ottawa (CA); San Hong Li, Shanghai (CN); Hui Shi, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/281,136

(22) Filed: Sep. 30, 2016

(65) Prior Publication Data

US 2017/0017474 A1 Jan. 19, 2017

Related U.S. Application Data

(63) Continuation of application No. 14/628,538, filed on Feb. 23, 2015, now Pat. No. 9,495,185.

(51) Int. Cl.
*G06F 8/41* (2018.01)
*G06F 9/455* (2018.01)
*G06F 8/30* (2018.01)

(52) U.S. Cl.
CPC ............. *G06F 8/443* (2013.01); *G06F 8/447* (2013.01); *G06F 9/4552* (2013.01); *G06F 8/37* (2013.01); *G06F 9/45525* (2013.01)

(58) Field of Classification Search
None
See application file for complete search history.

(56) References Cited

U.S. PATENT DOCUMENTS

| | | | | | |
|---|---|---|---|---|---|
| 6,637,025 | B1 * | 10/2003 | Beadle | ............... | G06F 9/45504 717/148 |
| 6,738,977 | B1 * | 5/2004 | Berry | ................. | G06F 9/44563 718/1 |

(Continued)

OTHER PUBLICATIONS

"Introduction to Java multitenancy"; developerWorks; May 12, 2014 (First published Sep. 17, 2013); Printed Feb. 20, 2015; 6 pages; <http://www.ibm.com/developerworks/java/library/j-multitenant-java/index.html?ca=drs>.

(Continued)

*Primary Examiner* — Isaac T Tecklu
(74) *Attorney, Agent, or Firm* — Edward J. Wixted, III

(57) ABSTRACT

In an approach for removing tenant initialization check per tenant for compiled code, a processor receives a request to create a tenant. A processor creates the tenant. A processor marks a current thread of the tenant as not eligible to run just-in-time (JIT) code, wherein the marking indicates that when a method is invoked, a non-JIT version of the method is executed. A processor executes initialization of a first class from an optimization list, wherein the optimization list is a configurable list of classes to be initialized prior to running JIT code. A processor determines that class initialization has been executed for all classes on the optimization list. A processor adjusts the marking to indicate that the current thread is eligible to run JIT code and that the tenant may run JIT code that assumes, without checking, that classes on the optimization list are initialized.

13 Claims, 4 Drawing Sheets

(56) References Cited

U.S. PATENT DOCUMENTS

| | | | | |
|---|---|---|---|---|
| 6,823,509 B2* | 11/2004 | Webb | G06F 9/466 | 717/174 |
| 7,058,934 B2* | 6/2006 | Sokolov | G06F 8/4434 | 712/E9.037 |
| 7,124,405 B1* | 10/2006 | Kakivaya | G06F 9/524 | 717/143 |
| 8,271,965 B2* | 9/2012 | Wang | G06F 9/45516 | 717/116 |
| 8,732,670 B1* | 5/2014 | Daudel | G06F 9/44521 | 717/127 |
| 2005/0050528 A1* | 3/2005 | Wang | G06F 9/45516 | 717/148 |
| 2005/0246695 A1* | 11/2005 | Wang | G06F 9/45516 | 717/148 |
| 2009/0125611 A1* | 5/2009 | Barsness | G06F 9/44563 | 709/220 |
| 2010/0115501 A1* | 5/2010 | Partridge | G06F 9/4552 | 717/148 |
| 2011/0202907 A1* | 8/2011 | Dice | G06F 8/456 | 717/148 |
| 2012/0117549 A1* | 5/2012 | Doyle | G06F 8/4443 | 717/147 |
| 2012/0266149 A1* | 10/2012 | Lebert | G06F 9/44563 | 717/166 |
| 2014/0237458 A1* | 8/2014 | Elias | G06F 8/41 | 717/148 |
| 2016/0011992 A1* | 1/2016 | Sandoz | G06F 3/0622 | 711/163 |
| 2016/0246621 A1 | 8/2016 | Ajila et al. | | |
| 2016/0246623 A1 | 8/2016 | Ajila et al. | | |

OTHER PUBLICATIONS

"Multitenancy feature"; IBM SDK, Java Technology Edition, Version 7 Release 1; Printed Feb. 23, 2015; 1 page; <http://www-01.ibm.com/support/knowledgecenter/SSYKE2_7.0.0/com.ibm.java.aix.71.doc/diag/understanding/mt_intro.html>.

"Optimized per tenant class initialization for a multi-tenant JVM"; An IP.com Prior Art Database Technical Disclosure; IP.com No. 000232457; pp. 1-4; IP.com Electronic Publication: Nov. 11, 2013.

"Appendix P—List of IBM Patents or Patent Applications Treated as Related"; Dated Sep. 30, 2016; pp. 1-2.

* cited by examiner

PER TENANT INITIALIZATION CHECK REMOVAL

BACKGROUND OF THE INVENTION

The present invention relates generally to the field of virtual machines, and more particularly to removing the initialization check in just-in-time (JIT) code per tenant in a multitenant virtual machine through controlled tenant bootstrap.

In computing, a virtual machine (VM) is an emulation of a particular computer system. Virtual machines operate based on the computer architecture and functions of a real or hypothetical computer, and the virtual machine's implementations may involve specialized hardware, software, or a combination of both. Classification of virtual machines can be based on the degree to which the virtual machine implements functionality of targeted real machines. System virtual machines (also known as full virtualization virtual machines) provide a complete substitute for the targeted real machine, and level of functionality required for the execution of a complete operating system. On the other hand, process virtual machines are designed to execute a single computer program by providing an abstracted and platform-independent program execution environment.

Just-in-time (JIT) compilation, also known as dynamic translation, is compilation done during execution of a program at run time, rather than prior to execution. Most often, the compilation consists of translation to machine code, which is then executed directly, but can also refer to translation to another format.

JIT compilation is a combination of the two traditional approaches of translation to machine code—ahead of time (AOT) compilation and interpretation—and combines some advantages and drawbacks of both. JIT compilation combines the speed of compiled code with the flexibility of interpretation, along with the overhead of an interpreter and the additional overhead of compiling (not just interpreting). JIT compilation is a form of dynamic compilation, and allows adaptive optimization, such as dynamic recompilation. Thus, in principle, JIT compilation can yield faster execution than static compilation. Interpretation and JIT compilation are particularly suited for dynamic programming languages, as the runtime system can handle late-bound data types and enforce security guarantees.

In computer programming, initialization is the assignment of an initial value for a data object or variable. The manner in which initialization is performed depends on programming language, as well as type, storage, class, etc., of an object to be initialized. Programming constructs which perform initialization are typically called initializers and initializer lists. Initialization is distinct from, and preceded by, declaration, although the two can sometimes be conflated in practice. The compliment of initialization is finalization, which is primarily used for objects, but not variables.

Initialization is done either by statically embedding the value at compile time, or else by assignment at run time. A section of code that performs such initialization is generally known as initialization code and may include other one-time-only functions, such as opening files. In object-oriented programming, initialization code may be part of a constructor (class method) or initializer (instance method). Setting a memory location to hexadecimal zeroes is also sometimes known as "clearing" and is often performed by an exclusive "or" instruction (both operands specifying the same variable) at machine code level, requiring no additional memory access.

SUMMARY

Aspects of an embodiment of the present invention disclose a method, computer program product, and computing system for removing tenant initialization check per tenant for compiled code. A processor receives a request to create a tenant. A processor creates the tenant. A processor marks a current thread of the tenant as not eligible to run just-in-time (JIT) code, wherein the marking indicates that when a method is invoked, a non-JIT version of the method is executed. A processor executes initialization of a first class from an optimization list, wherein the optimization list is a configurable list of classes to be initialized prior to running JIT code. A processor determines that class initialization has been executed for all classes on the optimization list. A processor adjusts the marking to indicate that the current thread is eligible to run JIT code and that the tenant may run JIT code that assumes, without checking, that classes on the optimization list are initialized.

DETAILED DESCRIPTION

Figure 1:
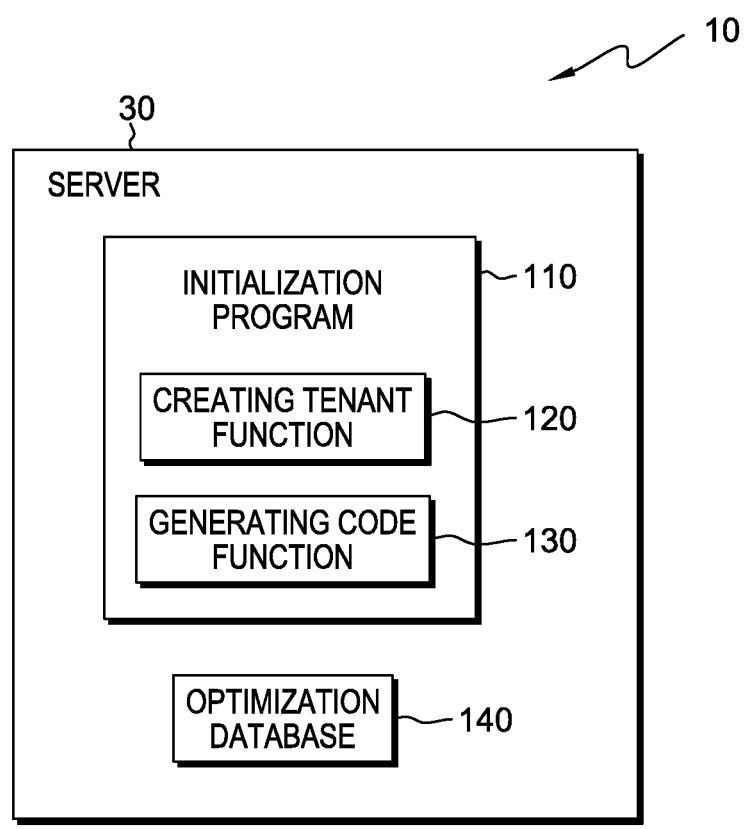
FIG. 1 depicts a block diagram of a computing system, in accordance with an embodiment of the present invention.

In the current state of computing environments, virtualized computing environments are designed to realize cost savings by maximizing the density of applications that can be run per unit of hardware, improving utilization rates of the hardware and energy efficiency by eliminating idle machines. Embodiments of the present invention recognize that it is important to adapt virtual machines to recognize and exploit these virtualized computing environments. In order to maximize application density, the virtual machine must reduce the virtual machine's resource footprint, adapt to changing resource allocation, and share more across virtual machine instances.

Sharing artifacts across virtual machine instances can reduce the amount of physical resources required to run each application. Many virtual machines, now, allow multiple applications (i.e., tenants) to run in the same virtual machine concurrently, while at the same time isolating each application from the other applications. Sharing the virtual machine provides maximum opportunities for sharing runtime artifacts, which is referred to as the multi-tenant feature. In order to allow multiple tenants to run concurrently in the same virtual machine, each tenant gets a view of statics fields, and the static initializer for a class is run once for each tenant. This is necessary as it is the static initializers that populate the initial values of the static fields for a class, and since each tenant has its own view of the static fields, they need to be initialized with an initial value for each tenant.

A class is an extensible program-code-template for creating objects, providing initial values for state (member variables, fields) and implementations of behavior (member functions, methods). In many languages, the class name is used as the name for the class (the template itself), the name for the default constructor of the class (subroutine that creates objects), and as the type of objects generated by the type; these distinct concepts are easily conflated. When an object is created by a constructor of the class, the resulting object is called an instance of the class. The member variables specific to the object are called instance variables, contrasting with the static fields that are shared across the class. Node that a class is one way to group and handle initialization of values shared across a runtime. While our technique is described in the context of classes, the technique is not limited to implementations that use classes. It can apply to any implementation where values are shared across the runtime for which each tenant will need its own copy.

In the case of a standard virtual machine, a class only needs to be initialized once. The need to initialize classes for every tenant means that initialization checks, only needed to be done once in the case of a standard virtual machine, need to be done for every tenant that requires the use of the particular class in the multi-tenant virtual machine. The result is that since tenants can be started/stopped at any time, common JIT optimizations cannot be applied to reduce the overhead of initialization checks.

Embodiments of the present invention recognize that extra initialization checks result in performance degradation when running with a multi-tenant virtual machine. Measurements have shown that the tenant initialization checks contribute to up to 3-4% of the overall degradation of performance in a multi-tenant virtual machine. Additionally, embodiments of the present invention allow the removal of tenant initialization checks in specific cases, which may result in a 1% reduction in the total degradation (from 20%-25% to 19%-24%).

Embodiments of the present invention will now be described in detail with reference to the Figures.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30. In some embodiments, computing system 10 can send and receive information over any network. The network (not shown) may be a local area network (LAN), a wide area network (WAN) such as the Internet, a cellular data network, any combination thereof, or any combination of connections and protocols that will support communications between server 30 and other computing devices (not shown) that may send information to server 30 and/or receive information from server 30, in accordance with embodiments of the invention. The network may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device. In other embodiments, server 30 may represent a server computing system utilizing multiple computers as a server system, such as in a cloud computing environment. In another embodiment, server 30 represents a computing system utilizing clustered computers and components to act as a single pool of seamless resources. Server 30 contains initialization program 110, creating tenant function 120, generating code function 130, and optimization database 140. Server 30 may include components, as depicted and described in further detail with respect to FIG. 4.

Initialization program 110 allows the initialization check to be omitted from compiled methods for a specific set of classes. In doing so, initialization program 110 creates a new tenant, marks the current thread as non-JIT eligible, and executes class initializations on classes from an optimization list. The optimization list is a configurable list that contains classes to be initialized. Initialization program 110 marks the current thread as JIT eligible and generates, or runs, JIT code with or without an initialization check, depending on whether the class is on the optimization list. In the depicted embodiment, initialization program 110 resides on server 30. In other embodiments, initialization program 110, or similar programs, may reside on another server or another computing device, provided that initialization program 110 has access to creating tenant function 120, generating code function 130, and optimization database 140 over any network.

Creating tenant function 120 creates tenants and forces the initialization of classes within the tenant initialization process. Creating tenant function 120 forces the initialization of classes from the optimization list. In the depicted embodiment, creating tenant function 120 is a function of initialization program 110. In other embodiments, creating tenant function 120 may be a separate program accessible by initialization program 110.

Generating code function 130 generates, or runs, JIT code with or without an initialization check. In one embodiment, generating code function 130 generates, or runs, JIT code without an initialization check if the particular class to be initialized is on the optimization list located in optimization database 140. In other embodiments, generating code function 130 generates, or runs, JIT code with an initialization check if the particular class to be initialized is not on the optimization list located in optimization database 140. In the depicted embodiment, generating code function 130 is a function of initialization program 110. In other embodiments, generating code function 130 may be a separate program accessible by initialization program 110.

Optimization database 140 is a repository that may be read by initialization program 110, creating tenant function 120, and generating code function 130. In some embodiments, a program (not shown) may allow an administrator or other user to define classes in an optimization list and store to optimization database 140. In other embodiments, initialization program 110 may define classes in an optimization list and store to optimization database 140. In the depicted embodiment, optimization database 140 resides on server 30. In other embodiments, optimization database 140, or similar databases, may reside on other computing devices accessible by initialization program 110, creating function 120, and generating code function 130.

A class is an extensible program-code-template for creating objects, providing initial values for member variables (i.e., fields) and implementations of behavior (i.e., member functions, methods). In many languages, the class name is used as the name for the class (i.e., the template itself), the name for the default constructor of the class (i.e., subroutine that creates objects), and as the type of objects generated by the type; these distinct concepts are easily conflated. When an object is created by a constructor of the class, the resulting object is called an instance of the class. The member variables specific to the object are called instance variables, contrasting with the static fields that are shared across the class.

Two or more applications that run in the same, conventional, virtual machine would not normally be isolated from one another. Each application's activity would affect what the other one could accomplish. Additionally, data that can be shared through static fields would be accessible to all applications. The multitenant virtual machine addresses these issues in two ways: static field isolation and resource constraints.

In the multitenant virtual machine, the invariant parts of classes are shared among tenants. These parts include the compiled code for methods, data structures used by the virtual machine, and other similar artifacts. The sharing results in a memory savings, because the separate copies that would exist if multiple virtual machines were used are unnecessary. However, the multitenant virtual machine gives each tenant its own copy of static fields. Because of static field isolation, along with the fact that each tenant can generally only get access to instances of objects created by that tenant, each tenant can only access data that is associated with itself. The result is data isolation between tenants.

Ideally, tenants would cooperate and use shared resources in an appropriate manner; however, bugs and malicious behavior can occur. The multitenant virtual machine provides controls that can be configured to limit a tenant's ability to misbehave and use resources in a way that affects other tenants. For example, values that can be controlled include: processor time, heap size, and thread count.

Figure 2:
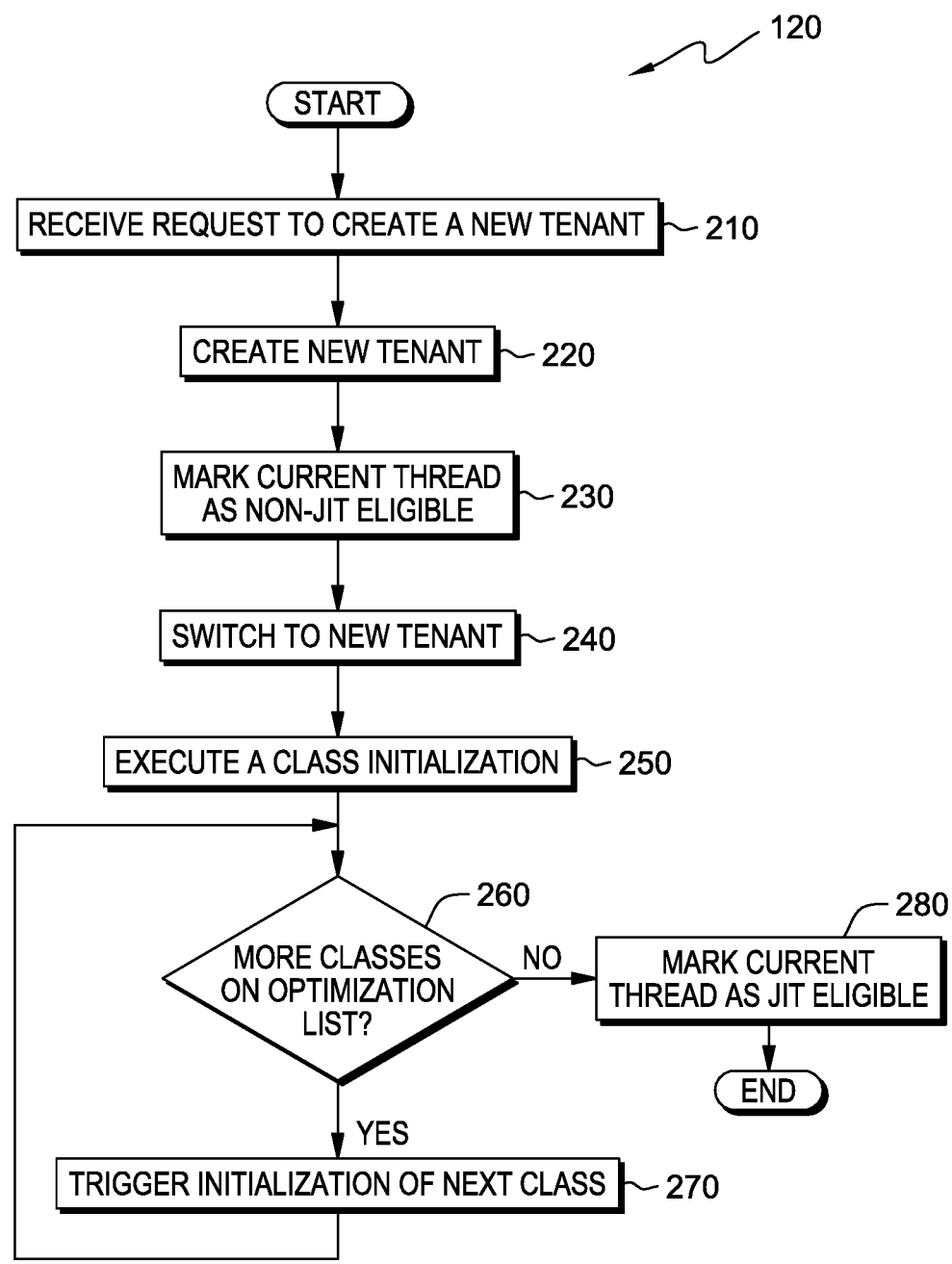
FIG. 2 depicts a flowchart of the steps of a creating tenant function, executing within the computing system of FIG. 1, for creating tenants and forcing initialization of classes within the tenant initialization process, in accordance with an embodiment of the present invention.

FIG. 2 depicts a flowchart of the steps of a creating tenant function, executing within the computing system of FIG. 1, in accordance with an embodiment of the present invention. Creating tenant function 120 creates tenants and forces initialization of classes within the tenant initialization process, in accordance with one embodiment of the present invention.

In step 210, creating tenant function 120 receives a request to create a new tenant. In some embodiments, creating tenant function 120 receives a request to create a new tenant from another program or application. In other embodiments, creating tenant function 120 receives a request to create a new tenant from an administrator or other user.

In step 220, creating tenant function 120 creates a new tenant. In one embodiment, when an application is launched as a tenant, creating tenant function 120 looks to see if a virtual machine daemon process is already running. A daemon is a computer program that runs as a background process, rather than being under the direct contact of an interactive user. If the virtual machine daemon process is not running, the tenant launcher starts a daemon process. After the daemon process starts, handshaking occurs between the daemon process and the tenant launcher. Handshaking is an automated process of negotiation that dynamically sets parameters of a communications channel established between two entities before normal communication over the channel begins. As part of this handshake, the environment of the launcher process and the tenant command-line options are sent to the daemon. Finally, the tenant created by creating tenant function 120 runs under the virtual machine daemon process.

In step 230, creating tenant function 120 marks the current thread being used by the new tenant as non-JIT eligible. By marking the current thread as non-JIT eligible, creating tenant function 120 makes the current thread not able to run JIT code and triggers the initial initialization of the tenant. In one embodiment, when a method is invoked, a bytecode version of the method is executed, even if the method has been compiled (the key part of this technique is that the non-optimized version of the code is run). Bytecode is a form of instruction set designed for efficient execution by a software interpreter. Unlike human-readable source code, bytecodes are compact numeric codes, constants, and references, which encode the result of parsing and semantic analysis of type, scope, and nesting depths of program objects. Bytecode allows better performance than direct interpretation of source code. A method (or message) is a procedure associated with an object class. An object is made up of behavior and data. Data is represented as properties of the object and behavior as methods. Methods are also the interface an object presents to the outside world. For example, a "window" object would have methods such as "open" and "close."

Marking the current thread as non-JIT eligible allows initialization program 110 to omit initialization checks in JIT code generated for the methods associated with the classes on the optimization list located within optimization database 140, as it is certain that these classes will be initialized for a tenant before the JIT version of the code can be run for that tenant. Marking the current thread is sufficient for initializations in virtual machines that are single-threaded. For virtual machines with multi-threaded initializations, creating tenant function 120 will mark any new thread in a tenant as non-JIT eligible until initialization is complete.

In step 240, creating tenant function 120 switches to the new tenant to run the new tenant. In one embodiment, when the new tenant is started, that tenant finds the existing shared virtual machine daemon and runs within that virtual machine.

In step 250, creating tenant function 120 executes a class initialization. Creating tenant function 120 enhances the initial initialization of the tenant to force initialization of the classes on the optimization list. Initialization prepares classes for use during a program's execution. Although initialization is usually used in terms of assigning values to variables, initialization can be anything that prepares a class for use in a program.

A program consists of classes. Before an application runs, a class loader loads the starting class and a bytecode verifier verifies the class. Embodiments of the present invention force the class loader to load a class from the optimization list and that particular class initializes. There are multiple ways that classes can be initialized. One type of class initialization is automatic initialization of class fields to default values. Another kind of class initialization is the explicit initialization of class fields to values, where each class field explicitly initializes to a value through a class field initializer. In contrast to automatic initialization, a class field initializer explicitly assigns a non-default value to each class field.

In decision 260, creating tenant function 120 determines whether more classes are on the optimization list. In some embodiments, creating tenant function 120 determines whether more classes are on the optimization list by searching optimization database 140 for the optimization list. If creating tenant function 130 finds more classes on the optimization list within optimization database 140 (decision 260, yes branch), creating tenant function 120 triggers initialization of the next class on the optimization list (step 270). If, and when, creating tenant function 120 does not find more classes on the optimization list within optimization database 140 (decision 260, no branch), creating tenant function 120 marks the current thread as JIT eligible (step 280). Creating tenant function 120 may use any method available to mark a thread.

Figure 3:
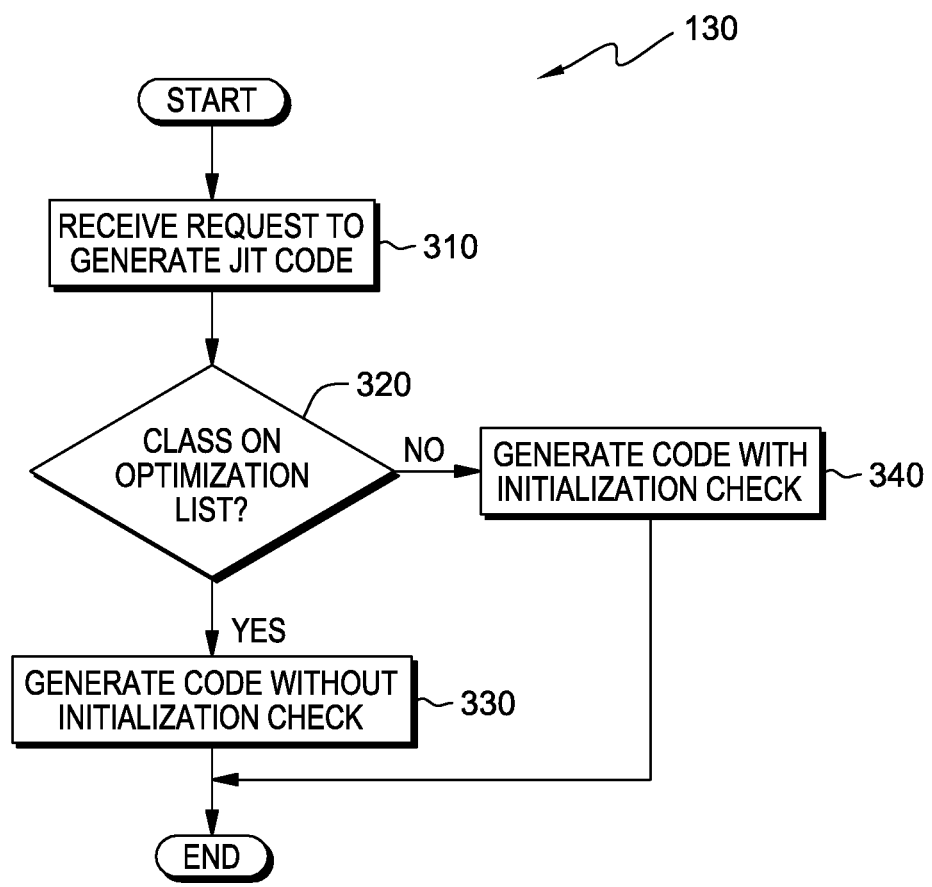
FIG. 3 depicts a flowchart of the steps of a generating code function, executing within the computing system of FIG. 1, for generating JIT code with or without an initialization check, in accordance with an embodiment of the present invention.

FIG. 3 depicts a flowchart of the steps of a generating code function, executing within the computing system of FIG. 1, in accordance with an embodiment of the present invention. Generating code function 130 operates to generate, or run, JIT code with or without an initialization check, in accordance with one embodiment of the present invention.

In step 310, generating code function 130 receives a request to generate, or run, JIT code. In some embodiments, generating code function 130 receives a request to generate, or run, JIT code from initialization program 110. In other embodiments, generating code function 130 receives a request to generate, or run, JIT code from another program or application. Most often, generating JIT code consists of translation to machine code to be directly executed. A common goal of using JIT techniques is to reach or surpass the performance of static compilation, while maintaining the advantages of bytecode interpretation.

In decision 320, generating code function 130 determines whether the class is on the optimization list. To determine whether the class is on the optimization list, generating code function 130 searches optimization database 140 for the optimization list. If generating code function 130 locates the class on the optimization list within optimization database 140 (decision 320, yes branch), generating code function 130 generates, or runs, JIT code without an initialization check (step 330). If generating code function 130 does not find the class on the optimization list within optimization database 140 (decision 320, no branch), generating code function 130 generates, or runs, JIT code with an initialization check (step 340).

Embodiments of the present invention are not limited to multitenant virtual machines. For example, embodiments of the present invention may be useful for ahead of time (AOT) compilation. In generated AOT code, there may be a need to include initialization checks, because it may be unknown as to which classes will be initialized when the AOT code runs (as opposed to code generated dynamically where the classes already initialized are known). Embodiments of the present invention may force initialization of classes before AOT code is run, allowing more aggressive assumptions to be made.

Figure 4:
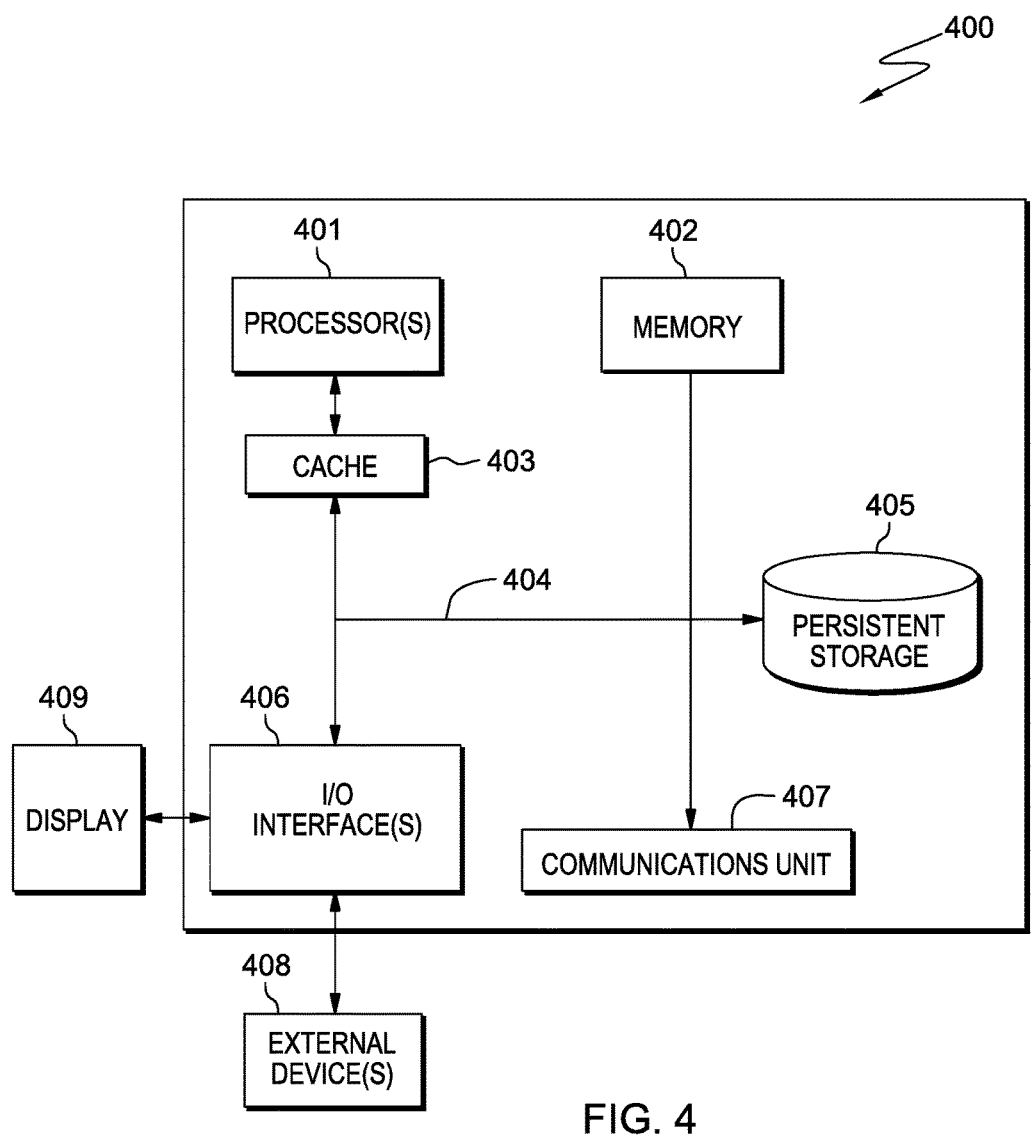
FIG. 4 depicts a block diagram of components of the server, in accordance with an embodiment of the present invention.

FIG. 4 depicts a block diagram of computer system 400, which is an example of a system that includes components of server 30. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Initialization program 110, creating tenant function 120, generating code function 130, and optimization database 140 may be stored in persistent storage 405 and in memory 402 for execution and/or access by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407. Initialization program 110, creating tenant function 120, generating code function 130, and optimization database 140 may be downloaded to persistent storage 405 of server 30 through communications unit 407 of server 30.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., initialization program 110, creating tenant function 120, generating code function 130, and optimization database 140, can be stored on such portable computer readable storage media and can be loaded onto persistent storage 405 of server 30 via I/O interface(s) 406 of server 30. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for removing tenant initialization check per tenant for compiled code, the computer program product comprising:
   one or more computer readable storage media and program instructions stored on the one or more computer readable storage media, the program instructions comprising:
   program instructions to receive a request to create a tenant;
   program instructions to create the tenant;
   program instructions to mark a current thread of the tenant as not eligible to run just-in-time (JIT) code, wherein the marking indicates that when a method is invoked, a non-JIT version of the method is executed;
   program instructions to execute initialization of a first class from an optimization list;
   program instructions to determine that class initialization has been executed for classes on the optimization list; and
   program instructions, responsive to determining that there are no more classes on the optimization list, to adjust the marking to indicate that the current thread is eligible to run JIT code without an initialization check.

2. The computer program product of claim 1, further comprising:
   program instructions, stored on the one or more computer readable storage media, to determine that there is a second class on the optimization list; and
   program instructions, stored on the one or more computer readable storage media, to execute initialization of the second class from the optimization list.

3. The computer program product of claim 1, further comprising:
   program instructions, stored on the one or more computer readable storage media, to receive a request to run JIT code for the first class;
   program instructions, stored on the one or more computer readable storage media, to determine that the first class is on the optimization list; and
   program instructions, stored on the one or more computer readable storage media, to run the requested JIT code without an initialization check for the first class.

4. The computer program product of claim 1, further comprising:
   program instructions, stored on the one or more computer readable storage media, to receive a request to run JIT code for a third class;
   program instructions, stored on the one or more computer readable storage media, to determine that the third class is not on the optimization list; and
   program instructions, stored on the one or more computer readable storage media, to run the requested JIT code with an initialization check for the third class.

5. The computer program product of claim 1, wherein just-in-time (JIT) is ahead-of-time (AOT).

6. The computer program product of claim 1, wherein program instructions to execute initialization of the first class comprise:
   program instructions to force initialization of the first class, wherein the initialization occurs regardless of whether the JIT code is compiled at the time of initialization.

7. The computer program product of claim 1, wherein the tenant is in a multi-tenant virtual machine.

8. A computer system for removing tenant initialization check per tenant for compiled code, the computer system comprising:
   one or more computer processors, one or more computer readable storage media, and program instructions stored on the computer readable storage media for execution by at least one of the one or more processors, the program instructions comprising:
   program instructions to receive a request to create a tenant;
   program instructions to create the tenant;
   program instructions to mark a current thread of the tenant as not eligible to run just-in-time (JIT) code, wherein the marking indicates that when a method is invoked, a non-JIT version of the method is executed;
   program instructions to execute initialization of a first class from an optimization list;
   program instructions to determine that class initialization has been executed for classes on the optimization list; and
   program instructions, responsive to determining that there are no more classes on the optimization list, to adjust the marking to indicate that the current thread is eligible to run JIT code without an initialization check.

9. The computer system of claim 8, further comprising:
   program instructions, stored on the computer readable storage media for execution by at least one of the one or more processors, to determine that there is a second class on the optimization list; and
   program instructions, stored on the computer readable storage media for execution by at least one of the one or more processors, to execute initialization of the second class from the optimization list.

10. The computer system of claim 8, further comprising:
    program instructions, stored on the computer readable storage media for execution by at least one of the one or more processors, to receive a request to run JIT code for the first class;
    program instructions, stored on the computer readable storage media for execution by at least one of the one or more processors, to determine that the first class is on the optimization list; and
    program instructions, stored on the computer readable storage media for execution by at least one of the one or more processors, to run the requested JIT code without an initialization check for the first class.

11. The computer system of claim 8, further comprising:
    program instructions, stored on the computer readable storage media for execution by at least one of the one or more processors, to receive a request to run JIT code for a third class;
    program instructions, stored on the computer readable storage media for execution by at least one of the one or more processors, to determine that the third class is not on the optimization list; and
    program instructions, stored on the computer readable storage media for execution by at least one of the one or more processors, to run the requested JIT code with an initialization check for the third class.

12. The computer system of claim 8, wherein just-in-time (JIT) is ahead-of-time (AOT).

13. The computer system of claim 8, wherein program instructions to execute initialization of the first class comprise:

program instructions to force initialization of the first class, wherein the initialization occurs regardless of whether the JIT code is compiled at the time of initialization.

* * * * *